July 10, 1923.

C. H. TOWER 1,461,234

SYSTEM FOR GENERATING AND DISTRIBUTING ELECTRIC CURRENTS

Filed April 3, 1919   3 Sheets-Sheet 1

July 10, 1923.

BEST AVAILABLE COPY 1,461,234

C. H. TOWER

SYSTEM FOR GENERATING AND DISTRIBUTING ELECTRIC CURRENTS

Filed April 3, 1919        3 Sheets-Sheet 2

Inventor
C. H. Tower
by
Ray S. Gehr
attorney

Patented July 10, 1923.　BEST AVAILABLE COPY　1,461,234

UNITED STATES PATENT OFFICE.

CHARLES H. TOWER, OF CLEVELAND, OHIO, ASSIGNOR TO THE TEAGLE COMPANY, OF CLEVELAND, OHIO, A CORPORATION OF OHIO.

SYSTEM FOR GENERATING AND DISTRIBUTING ELECTRIC CURRENTS.

Application filed April 3, 1919. Serial No. 287,108.

*To all whom it may concvern:*

Be it known that I, CHARLES H. TOWER, a citizen of the United States, residing at Cleveland, in the county of Cuyahoga and State of Ohio, have invented certain new and useful Improvements in Systems for Generating and Distributing Electric Currents, of which the following is a specification, reference being had therein to the accompanying drawings.

This invention relates to a system for generating and distributing electric currents and has to do more especially with apparatus adapted to generate low tension current for battery charging, lighting and the like and high tension ignition current for use in connection with internal combustion engines and especially engines used for automotive purposes.

One of the principal objects of my invention is to provide in a practical system for generating and distributing ignition current and low tension current for motor vehicles, a combined low tension current and high tension ignition current generating unit having a single source of field excitation for both the low tension and high tension generating circuits.

A further object of the invention is to provide a combined unit of the character described in which the maximum flux value through the generating winding of the ignition generator is maintained substantially constant irrespective of variations of the ignition generator field excitation, the field exciting current, and the density of the magnetic circuit of the low tension generator, or any of them.

In an earlier design I have provided a system comprising a combined unit low tension and high tension generating apparatus in which the two magnetic circuits of the high tension and low tension generating windings, respectively, are electrically excited by a common winding; and in another application for patent, Serial No. 266,437, filed December 12, 1918, I have shown another combined unit low tension and high tension generating apparatus in which the low tension and high tension magnetic circuits are separately excited, the excitation for the high tension circuit being provided by an electrical winding mounted on a rotor which acts by its rotation to pass the field flux through the high tension generating winding alternately in opposite directions, so that the ignition apparatus has a very wide sparking range made possible by this reversal of the field flux. In the case of the present invention one of my important objects is the provision of a combined unit generating apparatus which shall have both the advantages of simplicity and reduction in the number of parts incident to a common field excitation for the low tension and high tension magnetic circuits, and the advantage of wide sparking range incident to reversal of the field flux through the high tension generating coil.

This result I have secured by mounting both the high tension and low tension generating windings on the stator of the generating apparatus and by mounting the exciting winding for both magnetic circuits on a rotor which serves as a rotating field core common to both magnetic circuits and operating, by its movement, to shift the field flux in relation to the low tension and high tension windings, respectively, to effect the generation of currents therein.

Another object of the invention is the provision of a two wire system for the battery and low tension generator circuit which may be used without at any time grounding the battery current, even when it is passed through the primary of the high tension generating winding to facilitate starting of the engine.

Other objects of the invention, more or less incidental to the foregoing, will appear in the following description in connection with the accompanying drawings in which I show a preferred embodiment of the invention.

In the particular form of construction illustrated a unitary apparatus is provided for the generation of both the high tension and low tension currents, said apparatus comprising a unitary stator structure and a unitary rotor structure which provide the fixed and moving parts, respectively, of two magnetic circuits, one for the generation of high tension currents and the other for the generation of low tension currents.

Referring in detail to the construction illustrated, and first to the generating apparatus, 1 is a tubular frame and casing member which may be of iron, steel or other metal such as aluminum alloy. 2 is a frame and casing member of non-magnetic material such as aluminum alloy, secured as by screws 3 to one end of the casing 1. The other end of the last mentioned casing is closed by a plate 4 removably secured by screws 5. A cover plate casting 6, secured by screws 7, closes the outer end of the casing member 2.

In the casing 1 is mounted a stationary armature 8 comprising a cylindrical iron section 9 preferably consisting of a series of annular laminae riveted together and mounted in casing 1 with a forced fit. The laminae are punched to form a series of apertures 10 in which are mounted in well known manner the coils 11 of the generating winding of the armature. Each of the armature coils 11 has terminal leads $11^a$, $11^b$, each of which is connected to one of a series of commutator segments 12, 12. These commutator segments are secured by screws 13 to a ring 14 of insulating material which is fixedly mounted in casing 1.

In the casing 2 is mounted a laminated magnetic field structure 15 comprising side members 16, 16 which are secured by screws 17, 17 to the casing 2, and a cross member 18 which is secured to the side members by screws 19, 19. On the cross member 18 is mounted a high tension generating winding 20 consisting of a coarse primary section $20^a$ and a fine secondary section $20^b$. The side members 16 are formed with diametrically opposite polar faces $16^a$.

In the unitary stator structure above described is mounted a unitary rotor structure comprising a shaft 21 which is rotatably supported at one end in an anti-friction bearing 22 carried by cover plate 4, and at its other end in an anti-friction bearing 23 carried by the cover plate casting 6. On the shaft 21 is keyed an iron core and flux distributor 24 which is I-shaped in cross section and preferably forged from iron suitable for magnetic purposes.

At one end this core or flux distributor has its polar faces at $24^a$, $24^a$ arranged to co-operate with the polar faces $16^a$, $16^a$ of the stationary field structure 15, the parts being proportioned to provide an exceedingly short air gap of large area between the fixed and moving polar faces. At its other end the flux distributor has its polar faces at $24^b$, $24^b$ disposed within the hollow iron section 9 of the armature 8, with relatively long air gaps between the fixed and rotating parts. 25 is an exciting winding wound in shuttle fashion around the core or flux distributor of the rotor so as to set up two magnetic fields, one of which passes through the fixed field structure 15 and the high tension winding 20 thereon, while the other passes through the low tension armature 8 and both pass through the common core 24. In other words, a current passed through the exciting winding 25 constitutes a common source of field flux for both the high tension and the low tension magnetic fields. With the two magnetic fields excited in this manner, the rotation of the rotor causes the magnetic flux of the respective circuits to be periodically reversed in relation to the fixed generating windings, so that flux first of one polarity and then the other is shifted in and out of each generating winding or coil as the rotor turns.

In a combined unit generator of the character here in question, with both the high tension magnetic circuit and the low tension magnetic circuit excited from a common current source, an important consideration is the fact that the demands upon the high tension generator are radically different from the demands upon the low tension generator. To meet this condition I make use of the expedients set forth in my earlier designs previously referred to.

I have referred to the small and large air gaps of the magnetic circuits through the high tension and low tension generating windings, respectively. In addition, the effective air gap reluctance of the high tension magnetic circuit is made relatively low in comparison with the magnetic reluctance of the iron part of said circuit. Also, the iron parts of the high tension magnetic circuit are shaped and proportioned to reach substantial saturation approximately simultaneously, while this is not the case with the low tension circuit. Also the two magnetic circuits are preferably designed so that the specific reluctance of the circuit through the high tension winding is low in comparison with the reluctance of the circuit through the low tension generating winding. By the specific reluctance of the magnetic circuit is meant the reluctance of the said circuit per unit of cross-sectional area. Additional relationships that should preferably be embodied in the design are that the air gap reluctance of the magnetic circuit for the high tension winding is relatively low in comparison with the air gap reluctance of the magnetic circuit for the low tension winding, and that the ratio of the effective air gap reluctance of the magnetic circuit for the low tension winding to the reluctance of the iron part of said circuit is relatively high in comparison with the ratio of the air gap reluctance of the magnetic circuit of the high tension winding to the iron reluctance of said circuits; but usually these two characteristics will be insured by the attainment of those previously enumerated in this paragraph.

The effect of these design characteristics will be pointed out in connection with the operation of the apparatus.

A sleeve 26 is keyed on the rotor shaft near one end thereof and on this sleeve is mounted a disc 27 of insulating material which is designed primarily to carry brushes 28, 28 to co-operate with the commutator segments 12. The brushes 28 are square in cross section and are slidably mounted in screw sockets 29, 29 which are longitudinally adjustable in the disc 27. Coil springs 30, 30 serve to press the brushes into yielding contact with the commutator segments. On the outer side of the disc 27 three discs 31, 32 and 33 of insulating material are mounted on sleeve 26, the four discs and sleeve 26 being rigidly secured together by one or more screws 34. On the insulating discs 31, 32 and 33 are fixedly mounted slip rings 35, 36 and 37, respectively. Adjacent the screw sockets 29 are spring wire conductors 38, 38 secured to the disc 27 by screws 39, 39 with their outer ends engaging slots in the heads of the screw sockets 29, (thus holding the latter in adjusted position), and their inner ends connected, one to the slip ring 35 and the other to the slip ring 36. The exciting winding 25 has one of its terminal leads 25$^a$ connected to the conductor leading to slip ring 36 while its other terminal lead 25$^b$ is connected to the slip ring 37.

40, 41 and 42 are brushes engaging the slip rings 35, 36 and 37, respectively, and mounted in the inner ends of terminal binding posts 43, 44 and 45, respectively, which are mounted in and insulated from the cover plate 4.

On the end plate casting 6 is mounted a combined distributor and breaker mechanism. Said mechanism comprises a housing 46 formed with a bearing 47 in which is rotatably mounted a shaft 48, said shaft being secured against endwise movement by thrust collars 49 and 50. To the lower end of the shaft 48 is connected a shaft 51 on which is mounted a skew gear 52 that meshes with and is driven by a similar gear 53 on the end of rotor shaft 21, the speed ratio of the shafts 21 and 51 being 2 to 1 for a four cylinder engine, 3 to 1 for a six cylinder engine and so on.

On the upper end of the shaft 48 is an insulating block 54 which carries a radial distributor arm 55. The inner end of arm 55 is engaged by a brush 56 while its outer end is arranged to move successively through points adjacent to the several terminals 57, 57. The brush 56 and terminals 57, 57 are mounted in a cap 58 of suitable insulating material which is secured in position by one or more spring clips 59.

Figures 1, 2:
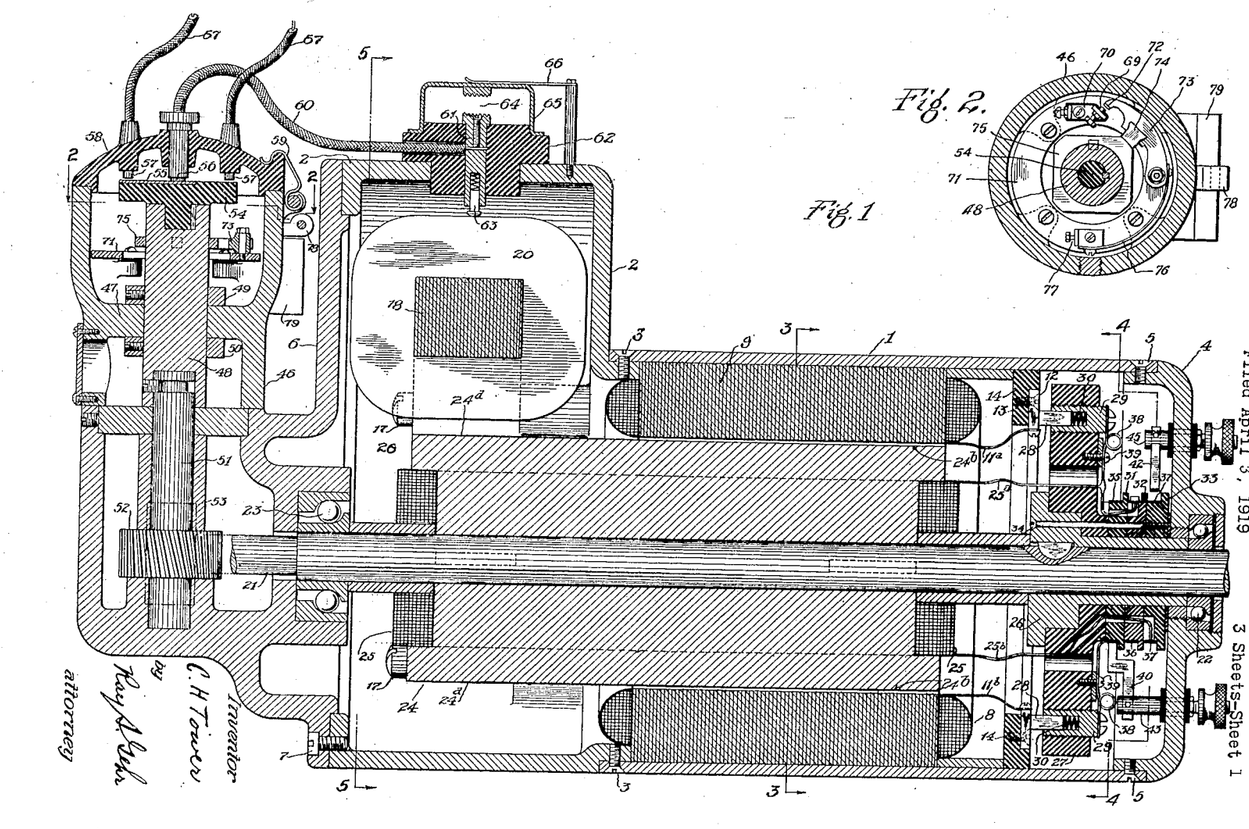
Fig. 1 is a vertical longitudinal section through generating apparatus made in accordance with my invention.
Fig. 2 is a section on the line 2—2, Fig. 1.
Figure 3:
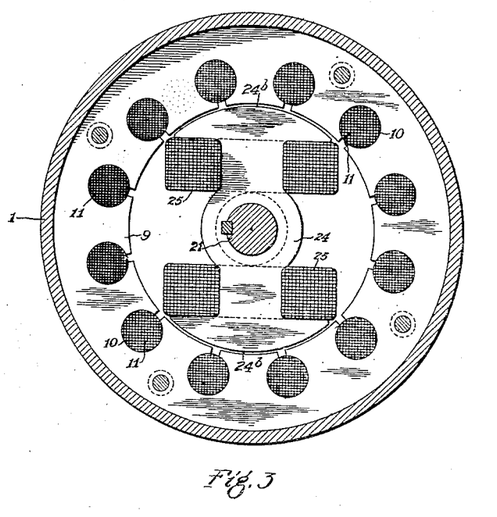
Figs. 3, 4 and 5 are sections on the lines 3—3, 4—4 and 5—5, respectively, Fig. 1, some of the structure being broken away, in the case of Fig. 4, to show certain details.
Figure 4:
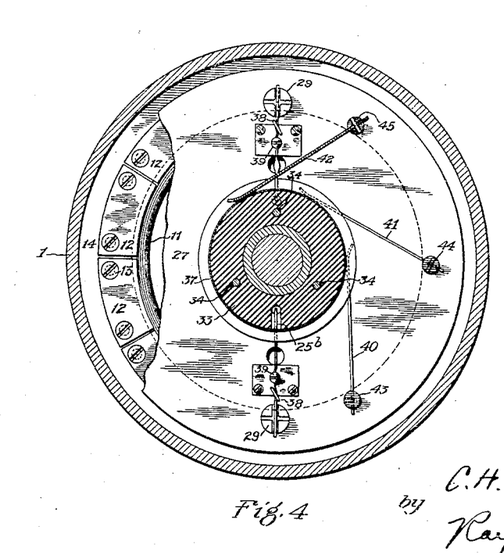
Figures 5, 6:
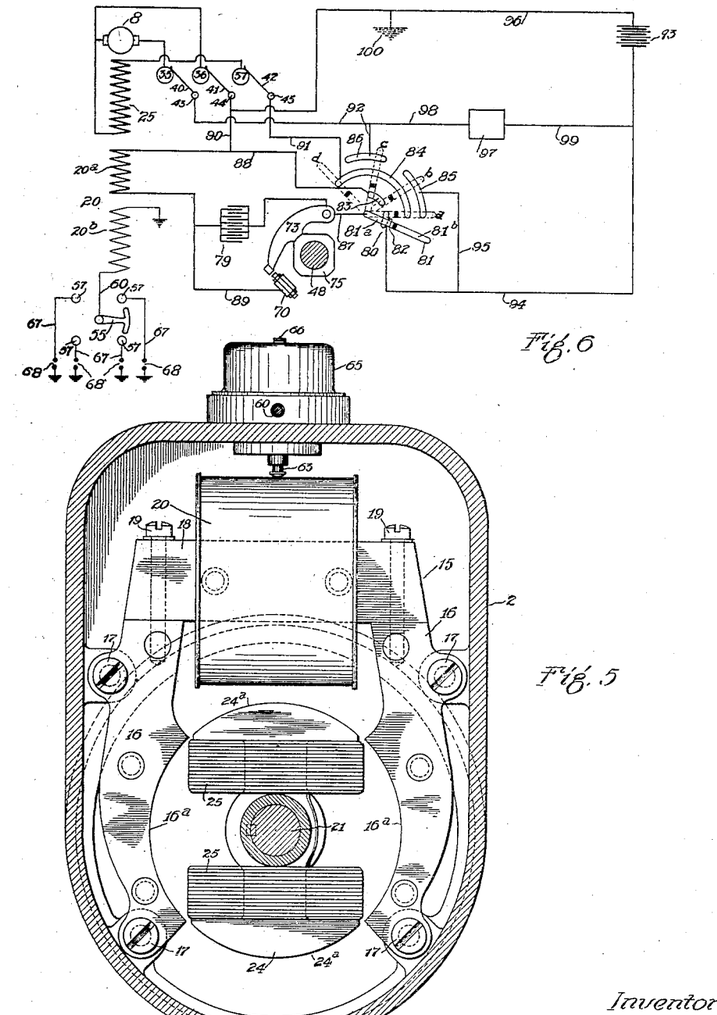
Fig. 6 is a diagram of the wiring of the generating apparatus and associated parts of the system.

The brush 56 is connected through lead 60 to a conductor 61 mounted in an insulating block 62 in the top of the casing 2. The conductor 61 is electrically connected by a spring-pressed contact device 63 with one of the terminals of the fine section 20$^b$ of the generating coil 20, the other end of the fine section 20$^b$ being grounded as indicated in Fig. 6. The upper end of conductor 61 constitutes one of the electrodes of the safety air gap 64, the other electrode of which is carried by a cap 65 secured in position by a spring clip 66.

The terminals 57, 57 are connected by leads 67, 67 to spark plugs 68, 68 of the engine cylinder in the usual manner.

The breaker mechanism comprises a fixed electrode 69 adjustably mounted on a holder 70 carried by and insulated from a ring 71 which is mounted on and suitably insulated from the housing 46. A movable electrode 72 is carried by an arm 73 pivotally mounted on the ring 71. The arm carries a fibre shoe 74 which is arranged to operatively engage an actuating cam 75 keyed to the shaft 48. The arm 73 is yieldingly pressed into engagement with the cam by a spring 76 which also serves to electrically connect the arm 73 with a suitably insulated terminal 77 on the ring 71. The housing 46 is angularly adjustable about the axis of the shaft 48 to provide for advancing and retarding the spark, and is provided with an arm 78 by which, through suitable connections, said angular adjustment can be made.

79 is a condenser mounted on the housing 46 and, as indicated in Fig. 6, electrically connected across the electrodes of the breaker.

Referring to the wiring diagram, Fig. 6, 80 is a control switch having a pivoted arm 81 comprising inner and outer sections 81$^a$ and 81$^b$ which are insulated from each other, together with contact segments 82 and 83, arranged to be engaged by the inner part 81$^a$ of the switch arm, and segments 84, 85 and 86 arranged to be engaged by the outer section 81$^b$ of the switch arm.

The inner pivoted end of the switch arm is connected by a lead 87 with the movable electrode of the breaker. The switch segment 83 is connected by lead 88 with one terminal of the primary or coarse section 20$^a$ of the high tension generating coil, the other terminal of said coarse section being connected by lead 89 with the fixed electrode of the breaker. The lead 88 is connected through a lead 90, terminal post 44 and brush 41 to the collector ring 36. Switch segment 84 is connected by lead 91, terminal post 45 and brush 42 to the slip ring 37. Switch segment 86 is connected by a lead 92, terminal post 43 and brush 40 to slip ring 35.

93 is a storage battery one terminal of which is connected through lead 94 with the switch segment 82 and through lead 95 with the switch segment 85, while its other terminal is connected through lead 96 to the terminal post 47 which is electrically connected to the slip ring 36.

97 is an automatic voltage-controlled cut-out device the terminals of which are connected by leads 98 and 99 to the leads 92 and 94, respectively.

The conductor 96 may or may not be grounded, as may be desired, at 100.

In the normal operation of the generating apparatus the exciting winding is connected to the low tension generator terminals in parallel with the outside load circuit so that the generator is self excited. With direct current flowing in the exciting coil, the flux thereby established in the flux distributor is shifted in relation to the coils of the stationary armature winding so as to generate therein currents which flow through the commutator segments and brushes in the well known manner characteristic of this type of direct current generators. Simultaneously, at the high tension end of the generator the magnetic flux established in the flux distributor by the exciting winding is caused, by the movement of the rotor, to pass alternately in opposite directions through the magnetic field structure 15 and the high tension generating coil thereon. When the flux distributor is in a horizontal position the flux through the high tension generating coil is at a maximum and, as the rotor turns, decreases during 90° of rotation at which point the value of the flux through the generating coil passes through zero and, reversing in direction, increases during the next 90° of rotation until it is again a maximum with the flux distributor horizontal again. Algebraically considered, however, the flux through the high tension generating winding continuously decreases throughout the 180° of rotation, and during a large part of this angular movement the rate of flux decrease continues approximately at its maximum value, thus affording a wide angular range in which a maximum high tension current value can be secured by the opening of the circuit through the primary of the high tension generating winding.

Considering the operation of the system in its entirety, to start the engine the switch 80 is moved either to the full line position shown in Fig. 6 or to the dotted line position a. Assuming the switch arm is in the full line position, the spark having been retarded by adjustment of housing 46 and the cut-out 97 being open by reason of the low speed of rotation, current flows from the storage battery through lead 94 and segment 82 to the switch arm and thence through lead 87, breaker electrodes and lead 89 to the primary of the high tension generating coil, returning from said coil through leads 88, 90 and 96 to the other terminal of the battery. As the rotor turns and the breaker electrodes, by the periodically timed operation of the actuating cam, are separated, the field induced by the battery current in the primary winding collapses and a high tension current is induced in the secondary which passes through the distributor and appears as a spark in one of the spark gaps of the engine in somewhat the same manner as in the so-called battery system of ignition. However, if the switch arm is moved to the dotted line position a, current flows from the battery through the primary winding of the high tension generating coil as before, but in addition a battery current flows through lead 95, switch segments 85 and 84, lead 91 and brush 42 to one terminal of the exciting winding 25, returning from the other terminal of said winding through brush 41 and lead 96 to the other terminal of the battery. The current in the primary of the high tension generating winding is now due mainly to the battery, but the field established by the battery current through the exciting winding, as the rotor turns, induces an E. M. F. in the primary which assists the battery current every alternate spark.

As the engine acquires speed the switch arm can be turned to either of the running positions b and c and the housing 46 adjusted to suitably advance the spark. With the switch arm in position b the battery current flows only through the field exciting winding 25. This current in the exciting winding sets up fields in both the high tension and low tension circuits of the generator, resulting in the generation of high tension ignition currents characteristic of the best direct high tension magneto generators and the establishment of a voltage across the low tension terminals of the generator which acts, when the generator speed has increased sufficiently, to close the cut-out 97, whereupon direct current is supplied by the generator both to charge the battery and energize the exciting winding.

With the switch arm in position c, no battery current flows in either the primary of the high tension winding or the exciting winding but direct current is supplied from the low tension generator to the exciting winding. As soon as the generator speed becomes high enough the cut-out closes and direct current flows from the generator to charge the battery.

When the switch arm is turned to position $d$ the circuits are opened and the engine stopped.

The advantages secured with my improved system will be best appreciated by those familiar with the widely varying conditions of operation which are met with in practice. When starting the engine the storage battery serves as the source of current for ignition purposes, but the voltage of the storage battery of such a system varies relatively widely from its fully charged condition to its critical point or to its fully discharged condition. This variation, in the case of a six volt system, for example, runs from about five volts or less to seven and a half volts, or about thirty per cent or over. This variation in voltage will cause corresponding variation of the excitation of the ignition generator and the apparatus must be so designed that such an exciting current will neither reduce the flux below that required to give a normal operation of the apparatus nor increase it to such a value that destructive arcing will be produced at the breaker or heating of the high tension winding ensue.

Furthermore, in starting a motor vehicle in cold weather by a motor starter, the current drawn from the battery is so excessive that, coupled with the effect on the battery of the low temperature, the battery voltage is sometimes reduced two or three volts. It is very desirable that the apparatus be adapted to give under these conditions a sufficiently hot spark for starting purposes and at the same time not be subject to a flux increase which will produce the afore-mentioned troubles of breaker arcing and heating of the high tension generating coils when the low tension generator begins to charge the battery and normal operation is resumed. With hand cranking under these cold weather conditions the voltage variations, of course, are not quite so marked but in this case it is necessary to have the apparatus so constructed that hot sparks may be obtained at a very low speed.

Again, the generator may be temporarily out of commission, making it necessary to start by hand cranking. This means that a hot spark at low speeds is required in spite of the fact that there is a greater variation of the low tension voltage when the generator is running without the battery, the amount of variation depending, of course, upon the regulation system used.

When the high tension and low tension generators are combined in single unit with a common exciting winding, the action is more complicated. Even under normal operating conditions, owing to the fact that the low tension generator is operating over a wide range of speeds, we have the necessity of reducing the flux in the armature as the speed increases if the voltage is to be kept constant. This may be done in a variety of ways. The armature reaction may be depended upon, as contemplated in the system disclosed, or other well known methods may be used. In the case of the armature reaction and, to some extent, with the other cases a magneto-motive force is introduced in the field circuit causing a reduction of the total effective magnetizing ampere-turns. Although this reduction must produce a considerable variation of the flux cut by the armature conductors, the variation of the flux in the high tension generator should be comparatively slight in order to maintain a uniformly hot spark at all speeds.

By designing the magnetic circuits of the generating apparatus as has been described, I insure that the high tension magnetic circuit shall be highly saturated even with a variable magneto-motive force, and this minimizes the effects on the ignition generator of varying field excitation due to varying low tension generator speeds and loads with the consequent field current variations, or to battery voltage variations, or to other causes.

The provision of the rotating current-excited field makes possible the reversal of the flux through the high tension generating winding and a correspondingly wide angular range through which the spark can be advanced or retarded.

By mounting both the high tension ignition current generating winding and the low tension direct current winding on the stator of the generating apparatus, and by providing a rotor with a magnetic section common to the high tension and low tension circuits and mounting a common exciting coil thereon, it is obvious that the construction is simplified and the number of parts reduced, as compared with prior constructions devised by me.

By grounding one terminal of the secondary of the high tension generating winding, as shown, instead of joining it to one terminal of the primary, as is commonly done, I am enabled to leave both terminals of the primary ungrounded and to use an ungrounded so called two wire system for the battery and low tension generator circuit, without at any time grounding the battery current even when it is passed through the primary to facilitate starting.

I do not in the present application claim that feature of my invention which makes possible the use of a two-wire system without any grounding of the battery current, as that phase of the invention is covered by my application Serial No. 634,660 filed April 26, 1923, as a division hereof.

In Fig. 6 I have not indicated the lights, starting motor and the like, which are commonly used in a system of this character but it will be understood that they may be connected in circuit in the well known manner so as to take current from either the low tension generator or the storage battery.

To those skilled in the art it will be clear from the foregoing description and explanations that various other forms of construction can be utilized in carrying out the invention and it will be understood that the foregoing description is for purposes of illustration and explanation and is not intended to define the scope of the invention. In particular it is to be understood that while there are advantages peculiar to the form of rotor construction illustrated in which the magnetic part of the single rotor forms a magnetic core common to both the high tension and low tension circuits, there are certain advantages incident to the mounting of both the low tension and high tension generating windings on the stator structure with the exciting winding on rotor parts whether said rotor parts be in the form of a single unitary rotor or not and I do not, therefore, limit my invention to the unitary rotor form of construction.

What I claim is:

1. A system for generating intermittent high tension current impulses for ignition purposes and low tension direct current, comprising a high tension ignition current generating winding, a low tension commutated direct current generating winding, a magnetic circuit in inductive relation to said high tension winding and having a rotatable section for effecting variation of magnetic flux density through said winding, a magnetic circuit in inductive relation to said low tension winding and having a rotatable section for inducing electro-motive force in said winding, and a field excitation winding in circuit with said low tension winding and constituting a source of field flux, common for normal excitation of both of said magnetic circuits.

2. A system for generating intermittent high tension current impulses for ignition purposes and low tension direct current, comprising a high tension ignition current generating winding, a low tension commutated direct current winding, a magnetic circuit in inductive relation to said high tension winding and having a rotatable section for effecting variation of magnetic flux density through said winding, a magnetic circuit in inductive relation to said low tension winding and having a rotatable section for inducing electro-motive force in said winding, an electric battery, and a field excitation winding in circuit with said battery and constituting a source of field flux, common for normal excitation of both of said magnetic circuits.

3. A system for generating intermittent high tension current impulses for ignition purposes and low tension direct current, comprising a high tension ignition current generating winding, a low tension commutated direct current winding, a magnetic circuit in inductive relation to said high tension winding and having a rotatable section for effecting variation of magnetic flux density through said winding, a magnetic circuit in inductive relation to said low tension winding and having a rotatable section for inducing electro-motive force in said winding, an electric storage battery, and a field excitation winding connected in parallel with said battery and low tension winding and constituting a source of field flux, common for normal excitation of both said magnetic circuits.

4. A system for generating intermittent high tension current impulses for ignition purposes and low tension direct current, comprising a high tension ignition current generating winding, a low tension commutated direct current winding, magnetic circuits in inductive relation to each of said windings, respectively, and each of said magnetic circuits having a rotatable iron section for inducing electro-motive force in its respective winding, and said rotatable sections being axially aligned and connected to rotate simultaneously, and a field excitation winding in circuit with said low tension winding and constituting a source of field flux, common for normal excitation of both of said magnetic circuits.

5. A system for generating intermittent high tension current impulses for ignition purposes and low tension direct current, comprising a high tension ignition current generating winding having a circuit breaker in circuit therewith, a low tension commutated direct current generating winding, magnetic circuits in inductive relation to each of said windings, respectively, and each of said magnetic circuits having a rotatable iron section for inducing electro-motive force in its respective winding, and said rotatable iron sections being axially aligned and having a common operating shaft, which also actuates said circuit breaker, and a field excitation winding in circuit with said low tension winding and constituting a source of field flux, common for normal excitation of both of said magnetic circuits.

6. A system for generating intermittent high tension current impulses for ignition purposes and low tension direct current, comprising a high tension ignition current generating winding, a low tension commutated direct current winding, and magnetic circuits in inductive relation with each of said windings, respectively, said magnetic circuits having a common core and each having a rotatable iron section for inducing electro-motive force in its respective winding and a common field exciting winding surrounding said core and constituting a source of magnetic flux for normal excitation of both of said magnetic circuits.

7. A system for generating intermittent high tension current impulses for ignition purposes and low tension direct current for other purposes, comprising a high tension ignition current generating winding, a low tension commutated direct current winding, a magnetic circuit in inductive relation to said high tension winding and having a rotatable iron section for effecting variation of magnetic flux density through said winding, a magnetic circuit in inductive relation to said low tension winding and having a rotatable iron section for inducing electro-motive force in said winding, and a field excitation winding constituting a source of field flux, common for normal excitation of both said magnetic circuits, the effective air gap reluctance of said magnetic circuit for said high tension winding being relatively low in comparison with the air gap reluctance of said magnetic circuit for said low tension winding.

8. A system for generating intermittent high tension current impulses for ignition purposes and low tension direct current for other purposes, comprising a high tension ignition current generating winding, a low tension commutated direct current winding, a magetic circuit in inductive relation to said high tension winding and having a rotatable iron section for effecting variation of magnetic flux density through said winding, a magnetic circuit in inductive relation to said low tension winding and having a rotatable iron section for inducing electro-motive force in said winding, and a field excitation winding constituting a source of field flux, common for normal excitation of both said magnetic circuits, the effective air gap reluctance of said magnetic circuit for said high tension winding being relatively low in comparison with the air gap reluctance of said magnetic circuit for said low tension winding, and also relatively low in comparison with the magnetic reluctance of the iron part of said magnetic circuit for said high tension winding.

9. A system for generating intermittent high tension current impulses for ignition purposes and low tension direct current for other purposes, comprising a high tension ignition current generating winding, a low tension commutated direct current winding, a magnetic circuit in inductive relation to said high tension winding and having a rotatable iron section for effecting variation of magnetic flux density through said winding, a magnetic circuit in inductive relation to said low tension winding and having a rotatable iron section for inducing electro-motive force in said winding, and a field excitation winding constituting a source of field flux, common for normal excitation of both said magnetic circuits, the air gap density and air gap reluctance of said magnetic circuit for said high tension winding requiring relatively small magneto motive force to establish maximum flux therethrough as compared with the magneto motive force required by the iron part of said magnetic circuit for the high tension winding.

10. A system for generating intermittent high tension current impulses for ignition purposes and low tension direct current for other purposes, comprising a high tension ignition current generating winding, a low tension commutated direct current winding, a magnetic circuit in inductive relation to said high tension winding and having a rotatable iron section for effecting variation of magnetic flux density through said winding, a magnetic circuit in inductive relation to said low tension winding and having a rotatable iron section for inducing electro-motive force in said winding, and a field excitation winding constituting a source of field flux, common for normal excitation of both said magnetic circuits, the air gap density and air gap reluctance of said magnetic circuit for said high tension winding requiring relatively small magneto motive force for maximum flux therethrough as compared with the magneto motive force required by the air gap of said magnetic circuit for the low tension winding.

11. A system for generating intermittent high tension current impulses for ignition purposes and low tension direct current for other purposes, comprising a high tension ignition current generating winding, a low tension commutated direct current winding, a magnetic circuit in inductive relation to said high tension winding and having a rotatable iron section for effecting variation of magnetic flux density through said winding, a magnetic circuit in inductive relation to said low tension winding and having a rotatable iron section for inducing electro-motive force in said winding, and a field excitation winding constituting a source of field flux, common for normal excitation of both said magnetic circuits, the air gap density and air gap reluctance of said magnetic circuit for said high tension winding requiring relatively small magneto motive force to effect maximum flux therethrough as compared with the magneto motive force required by the iron part of said magnetic circuit for the high tension winding and also as compared with that required by the air gap reluctance of said magnetic circuit for the low tension winding.

12. A system for generating intermittent high tension current impulses for ignition purposes and low tension direct current for other purposes, comprising a high tension ignition current generating winding, a low tension commutated direct current winding, magnetic circuits in inductive relation to said windings, respectively, and each having a rotatable iron section for inducing electromotive force in its respective winding, said rotatable iron sections being axially aligned and connected together to rotate simultaneously, and a field excitation winding constituting a source of field flux, common for normal excitation of both said magnetic circuits, the air gap density and air gap reluctance of said magnetic circuit for said high tension winding requiring relatively small magneto motive force for maximum flux therethrough as compared with the magnetic motive force required by the iron part of said magnetic circuit for the high tension winding and also as compared with that required by the air gap reluctance of said magnetic circuit for the low tension winding.

13. In a single unit direct low tension current and high tension ignition current generator, the combination of a unitary magnetic field structure, separate generating windings therein, one for low tension direct current and the other for high tension ignition current, a rotor common to said windings and having at one end a flux distributing section for distributing flux of the field first through and then outside of said high tension generating winding, and an exciting winding disposed in said field structure to excite in common the magnetic circuits for both of said windings.

14. A system for generating intermittent high tension current impulses for ignition purposes and low tension direct current for other purposes, comprising a high tension ignition current generating winding, a low tension commutated direct current winding, a magnetic circuit in inductive relation to said high tension winding and having a rotatable iron section for effecting variation of magnetic flux density through said winding, a magnetic circuit in inductive relation to said low tenson winding and having a rotatable iron section for inducing electromotive force in said winding, and a field excitation winding constituting a source of field flux, common for normal excitation of both said magnetic circuits, the specific reluctance of the magnetic circuit of the high tension generating winding being small as compared to that of the magnetic circuit of the low tension generating winding.

15. In a single unit direct low tension current and high tension ignition current generator, the combination of a unitary magnetic field structure having branched flux paths, separate generating windings in said paths respectively, one for low tension direct current and the other for high tension ignition current, a rotor common to said windings and having at one end a flux distributing section for distributing flux of the field first through and then outside of said high tension generating winding and an exciting winding disposed in said field structure to excite in common the magnetic circuits for both of said windings.

16. A system for generating intermittent high tension current impulses for ignition purposes and low tension direct current for other purposes, comprising a high tension ignition current generating winding, a low tension commutated direct current winding, a magnetic circuit in inductive relation to the high tension winding and having a rotatable iron section for effecting variation of magnetic flux density through said winding, a magnetic circuit in inductive relation to the low tension winding and having a rotatable iron section for inducing electro-motive force in said winding, and a field excitation winding constituting in normal operation a common source of field flux for both said magnetic circuits, the effective air gap reluctance of the magnetic circuit for the high tension winding being relatively low in comparison with the magnetic reluctance of the iron part of said magnetic circuit, the ratio of the effective air gap reluctance of the magnetic circuit for the low tension winding to the reluctance of the iron part of said circuit being relatively high in comparison with the ratio of the air gap reluctance of the magnetc circuit of the high tension winding to the iron reluctance of said circuit, and the specific reluctance of the magnetic circuit of the high tension winding being relatively low in comparson with the specific reluctance of the magnetic circuit of the low tension winding.

17. A system for generating intermittent high tension current impulses for ignition purposes and low tension direct current for other purposes, comprising a high tension ignition generating winding, a low tension commutated direct current winding, a magnetic circuit in inductive relation to the high tension winding and having a rotatable iron section for effecting variation of magnetic flux density through said winding, a magnetic circuit in inductive relation to the low tension winding and having a rotatable iron section for inducing electro-motive force in said winding, and a field excitation winding constituting in normal operation a common source of field flux for both said magnetic circuits, all iron parts of the magnetic circuit of the high tension winding being shaped and proportioned to reach saturation approximately simultaneously, the ratio of the effective air gap reluctance of the magnetic circuit for the low tension winding to the reluctance of the iron part of the said circuit being relatively large in comparison with the ratio of the air gap reluctance of the magnetic circuit of the high tension winding to the iron reluctance of said circuit, and the specific reluctance of the magnetic circuit of the high tension winding being relatively low in comparison with the specific reluctance of the magnetic circuit of the low tension winding.

18. A system for generating intermittent high tension current impulses for ignition purposes and low tension direct current for other purposes, comprising a high tension ignition current generating winding, a low tension commutated direct current winding, a magnetic circuit in inductive relation to the high tension winding and having a rotatable iron section for effecting variation of magnetic flux density through said winding, a magnetic circuit in inductive relation to the low tension winding and having a rotatable iron section for inducing electro-motive force in said winding, and a field excitation winding constituting in normal operation a common source of field flux for both said magnetic circuits, the effective air gap reluctance of the magnetic circuit for the high tension winding being relatively low in comparison with the magnetic reluctance of the iron part of said magnetic circuit, all iron parts of the magnetic circuit for the high tension winding being shaped and proportioned to reach saturation approximately simultaneously, the ratio of the effective air gap reluctance of the magnetic circuit for the low tension winding to the reluctance of the iron part of said circuit being relatively large in comparison with the ratio of the air gap reluctance of the magnetic circuit of the high tension winding to the iron reluctance of said circuit, and the specific reluctance of the magnetic circuit of the high tension winding being relatively low in comparison with the specific reluctance of the magnetic circuit of the low tension winding.

19. A system for generating intermittent high tension current impulses for ignition purposes and low tension direct current for other purposes, comprising a high tension ignition current generating winding, a low tension commutated direct current winding, a magnetic circuit in inductive relation to the high tension winding and having a rotatable iron section for effecting variation of magnetic flux density through said winding, a magnetic circuit in inductive relation to the low tension winding and having a rotatable iron section for inducing electro-motive force in said winding, and a field excitation winding constituting in normal operation a common source of field flux for both said magnetic circuits, the effective air gap reluctance of the magnetic circuit for the high tension winding being relatively low in comparison with the magnetic reluctance of the iron part of said magnetic circuit, and the specific reluctance of the magnetic circuit of the high tension winding being relatively low in comparison with the specific reluctance of the magnetic circuit of the low tension winding.

20. A system for generating intermittent high tension current impulses for ignition purposes and low tension direct current for other purposes, comprising a high tension ignition current generating winding, a low tension commutated direct current winding, a magnetic circuit in inductive relation to the high tension winding and having a rotatable iron section for effective variation of magnetic flux density through said winding, a magnetic circuit in inductive relation to the low tension winding and having a rotatable iron section for inducing electro-motive force in said winding, and a field excitation winding constituting in normal operation a common source of field flux for both said magnetic circuits, all iron parts of the magnetic circuit for the high tension winding being shaped and proportioned to reach saturation approximately simultaneously, and the specific reluctance of the magnetic circuit of the high tension winding being relatively low in comparison with the specific reluctance of the magnetic circuit of the low tension winding.

21. A system for generating intermittent high tension current impulses for ignition purposes and low tension direct current for other purposes, comprising a high tension ignition current generating winding, a low tension commutated direct current winding, a magnetic circuit in inductive relation to the high tension winding and having a rotatable iron section for effecting variation of magnetic flux density through said winding, a magnetic circuit in inductive relation to the low tension winding and having a rotatable iron section for inducing electro-motive force in said winding, and a field excitation winding constituting in normal operation a common source of field flux for both said magnetic circuits, the effective air gap reluctance of the magnetic circuit for the high tension winding being relatively low in comparison with the magnetic reluctance of the iron part of said magnetic circuit, all iron parts of the magnetic circuit for the high tension winding being shaped and proportioned to reach saturation approximately simultaneously, and the specific reluctance of the magnetic circuit of the high tension winding being relatively low in comparison with the specific reluctance of the magnetic circuit of the low tension winding.

22. A system for generating intermittent high tension current impulses for ignition purposes and low tension direct current for other purposes, comprising a high tension ignition current generating winding, a low tension commutated direct current winding, a magnetic circuit in inductive relation to the high tension winding and having a rotatable iron section for effecting variation of magnetic flux density through said winding, a magnetic circuit in inductive relation to the low tension winding and having a rotatable iron section for inducing electromotive force in said winding, and a field excitation winding constituting in normal operation a common source of field flux for both said magnetic circuits, the effective air gap reluctance of the magnetic circuit for the high tension winding being relatively low in comparison with the magnetic reluctance of the iron part of said magnetic circuit and the ratio of the effective air gap reluctance of the magnetic circuit for the low tension winding to the reluctance of the iron part of said circuit being relatively large in comparison with the ratio of the air gap reluctance of the magnetic circuit of the high tension winding to the iron reluctance of said circuit.

23. A system for generating intermittent high tension current impulses for ignition purposes and low tension direct current for other purposes, comprising a high tension ignition current generating winding, a low tension commutated direct current winding, a magnetic circuit in inductive relation to the high tension winding and having a rotatable iron section for effecting variation of magnetic flux density through said winding, a magnetic circuit in inductive relation to the low tension winding and having a rotatable iron section for inducing electromotive force in said winding, and a field excitation winding constituting in normal operation a common source of field flux for both said magnetic circuits, all iron parts of the magnetic circuit for the high tension winding being shaped and proportioned to reach saturation approximately simultaneously and the effective air gap reluctance of the magnetic circuit for the high tension winding being relatively low in comparison with the magnetic reluctance of the iron part of said magnetic circuit.

24. A system for generating intermittent high tension current impulses for ignition purposes and low tension direct current for other purposes, comprising a high tension ignition current generating winding, a low tension commutated direct current winding, a magnetic circuit in inductive relation to the high tension winding and having a rotatable iron section for effecting variation of magnetic flux density through said winding, a magnetic circuit in inductive relation to the low tension winding and having a rotatable iron section for inducing electro-motive force in said winding, and a field excitation winding constituting in normal operation a common source of field flux for both said magnetic circuits, the effective air gap reluctance of the magnetic circuit for the high tension winding being relatively low in comparison with the magnetic reluctance of the iron part of said magnetic circuit, all iron parts of the magnetic circuit for the high tension winding being shaped and proportioned to reach saturation approximately simultaneously and the ratio of the effective air gap reluctance of the magnetic circuit for the low tension winding to the reluctance of the iron part of said circuit being relatively large in comparison with the ratio of the air gap reluctance of the magnetic circuit of the high tension winding to the iron reluctance of said circuit.

25. A system for generating intermittent high tension current impulses for ignition purposes and low tension direct current for other purposes, comprising a high tension ignition current generating winding, a low tension commutated direct current winding, a magnetic circuit in inductive relation to the high tension winding and having a rotatable iron section for effecting variation of magnetic flux density through said winding, a magnetic circuit in inductive relation to the low tension winding and having a rotatable iron section for inducing electromotive force in said winding, and a field excitation winding constituting in normal operation a common source of field flux for both said magnetic circuits, the ratio of the effective air gap reluctance of the magnetic circuit for the low tension winding to the reluctance of the iron part of said circuit being relatively large in comparison with the ratio of the air gap reluctance of the magnetic circuit of the high tension winding to the iron reluctance of said circuit, and the specific reluctance of the magnetic circuit of the high tension winding being relatively low in comparison with the specific reluctance of the magnetic circuit of the low tension winding.

26. In an electrical system, the combination of stator and rotor structures comprising the fixed and moving parts, respectively, of two magnetic circuits, a high tension ignition current generating winding mounted on the stator in inductive relation to one of said magnetic circuits, a low tension commutated direct current generating winding mounted on the stator in inductive relation to the other magnetic circuit, means for exciting both of said magnetic circuits comprising an exciting winding on the rotor and connections between the low tension direct current generating winding and said exciting winding to supply direct current to the latter, the rotor being adapted in operation to distribute field flux through the high tension generating winding alternately in opposite directions and to induce electro-motive force in the low tension generating winding, and a circuit breaker operated synchronously with the movement of the rotor for opening and closing the circuit of the high tension generating winding.

27. In an electrical system, the combination of stator and rotor structures comprising the fixed and moving parts, respectively, of two magnetic circuits, a high tension ignition current generating winding mounted on the stator in inductive relation to one of said magnetic circuits, a low tension commutated direct current generating winding mounted on the stator in inductive relation to the other magnetic circuit, means for exciting both of said magnetic circuits comprising an exciting winding on the rotor and connections between the low tension direct current generating winding and said exciting widing to supply direct current to the latter, the rotor being adapted in operation to distribute field flux through the high tension generating winding alternately in opposite directions and to induce electro-motive force in the low tension generating winding, a circuit breaker operated synchronously with the movement of the rotor for opening and closing the circuit of the high tension generating winding, and means for angularly adjusting the circuit breaker to advance and retard the ignition spark.

28. In an electrical system, the combination of stator and rotor structures comprising the fixed and moving parts, respectively, of two magnetic circuits, a high tension ignition current generating winding mounted on the stator in inductive relation to one of said magnetic circuits, a low tension commutated direct current generating winding mounted on the stator in inductive relation to the other magnetic circuit, means for exciting both of said magnetic circuits comprising an exciting winding common to both of said magnetic circuits and mounted on the rotor and connections between the low tension direct current generating winding and said exciting winding to supply direct current to the latter, the rotor being adapted in operation to distribute field flux through the high tension generating winding alternately in opposite directions and to induce electro-motive force in the low tension generating winding, and a circuit breaker operated synchronously with the movement of the rotor for opening and closing the circuit of the high tension generating winding.

In testimony whereof, I hereunto affix my signature.

CHARLES H. TOWER.